United States Patent [19]

Chang

[11] Patent Number: 5,667,206
[45] Date of Patent: Sep. 16, 1997

[54] HYBRID COMPOSITE LEAF SPRINGS

[75] Inventor: Jemei Chang, Sugarland, Tex.

[73] Assignee: General Motors Corporation, Detroit, Mich.

[21] Appl. No.: 387,641

[22] Filed: Feb. 13, 1995

Related U.S. Application Data

[60] Division of Ser. No. 184,548, Jan. 21, 1994, Pat. No. 5,425,829, which is a continuation-in-part of Ser. No. 24,894, Mar. 1, 1993, abandoned, which is a continuation of Ser. No. 712,288, Jun. 10, 1991, abandoned.

[51] Int. Cl.$^6$ .......................................................... F16F 1/36
[52] U.S. Cl. ............................................. 267/148; 267/149
[58] Field of Search ......................................... 267/148, 149; 264/257, 258, 136, 280, 156; 156/169, 172–175

[56] References Cited

U.S. PATENT DOCUMENTS

| | | | |
|---|---|---|---|
| 4,167,429 | 9/1979 | Ackley | 156/174 |
| 4,167,604 | 9/1979 | Aldrich | 267/148 |
| 4,260,143 | 4/1981 | Kliger | 267/148 |
| 4,352,769 | 10/1982 | Meyer | 264/134 |
| 4,414,049 | 11/1983 | Jones | 156/166 |
| 4,464,216 | 8/1984 | Gardiner | 156/162 |
| 4,530,490 | 7/1985 | Misumi | 267/47 |
| 4,556,204 | 12/1985 | Pflederer | 267/148 |
| 4,565,356 | 1/1986 | Nickel | 267/54 R |
| 4,659,071 | 4/1987 | Woltron | 267/149 |
| 4,707,317 | 11/1987 | Epel et al. | 264/136 |
| 5,098,510 | 3/1992 | Krummenacher | 267/148 |
| 5,194,111 | 3/1993 | Meatto | 156/166 |

FOREIGN PATENT DOCUMENTS

| | | |
|---|---|---|
| 0216748 A1 | 4/1987 | European Pat. Off. . |
| 58-77941 | 5/1983 | Japan . |
| 61-40852 | 9/1986 | Japan . |
| 1285229 A1 | 1/1987 | U.S.S.R. . |

OTHER PUBLICATIONS

*Handbook of Composites*, Van Norstrand Reinhold Co., New York (1982), pp. 450–451.
Warner et al, *Plastics Design Forum*, Jul./Aug. 1980, pp. 14, 16, 17.

Primary Examiner—Robert J. Oberleitner
Assistant Examiner—C. T. Bartz
Attorney, Agent, or Firm—George A. Grove

[57] ABSTRACT

A hybrid composite automotive leaf spring comprises parallel glass and polyethylene terephthalate fibers distributed in a pattern replicated throughout a resin matrix. A method of producing the hybrid composite leaf spring comprises winding various proportions of glass and polyethylene terephthalate or nylon fibers together into a homogeneous mass in an epoxy matrix in a mold to form a blank, which is then compressed and cured into a leaf spring having a predetermined homogeneous mixture of parallel fibers distributed throughout the cross-section of the spring. The unitary spring has a spring rate that is a composite of the resin-bonded glass and other fibers. Different spring rates are obtained by varying the percentage content of the glass and other fibers, while maintaining the homogeneity of the resultant leaf spring.

5 Claims, 3 Drawing Sheets

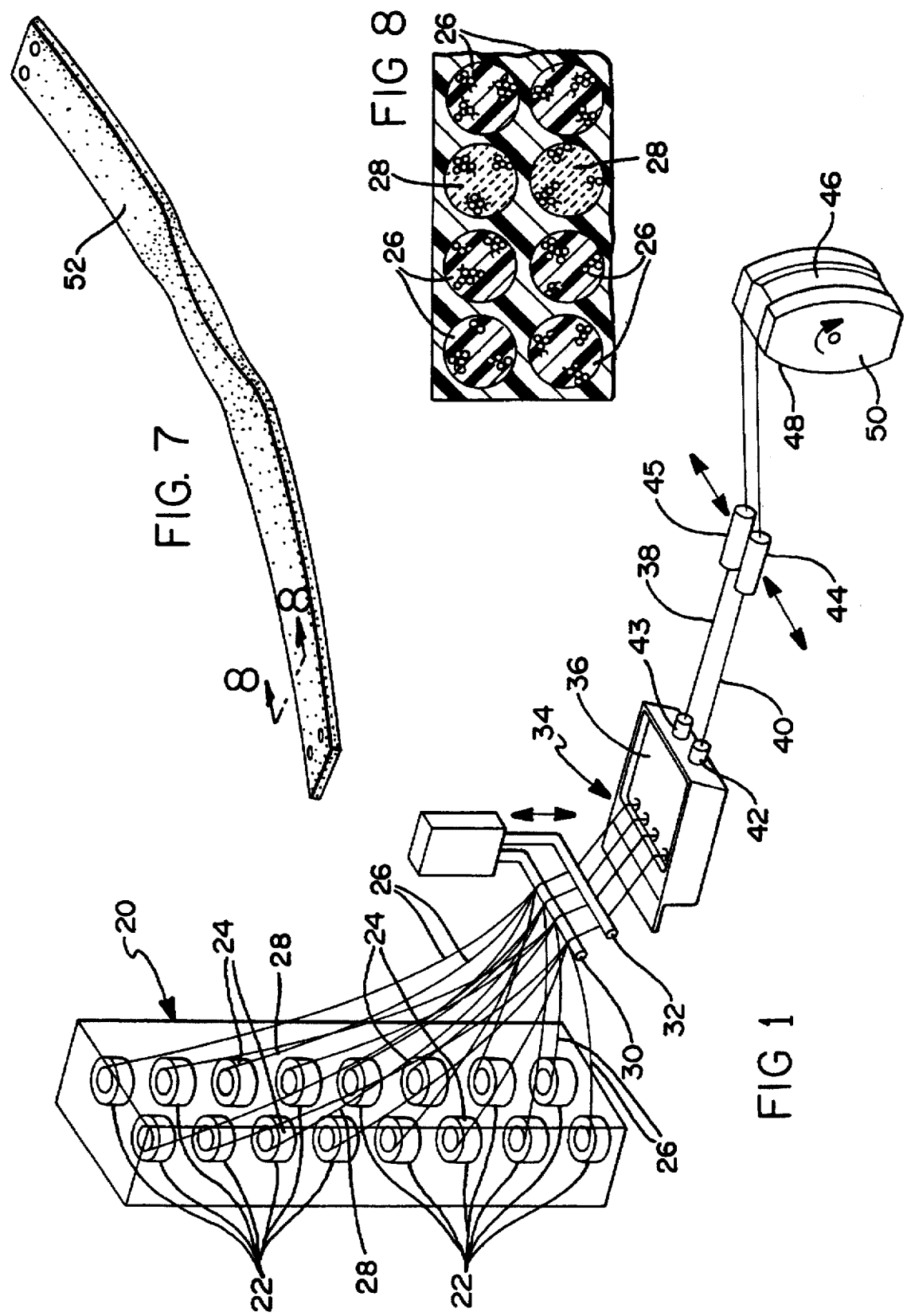

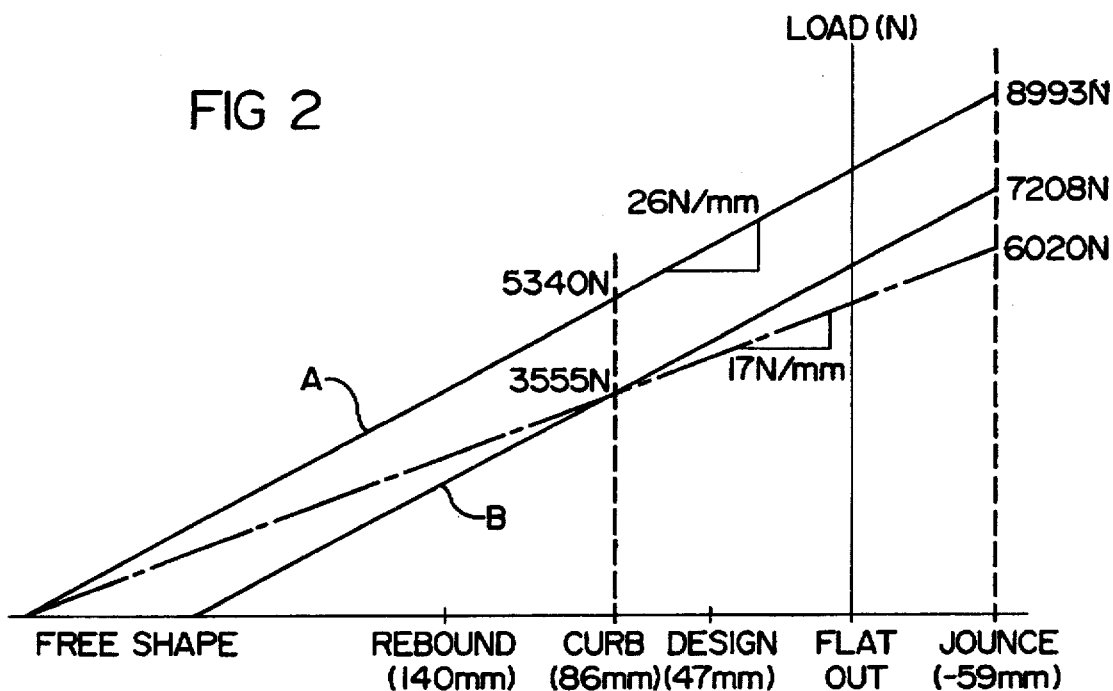
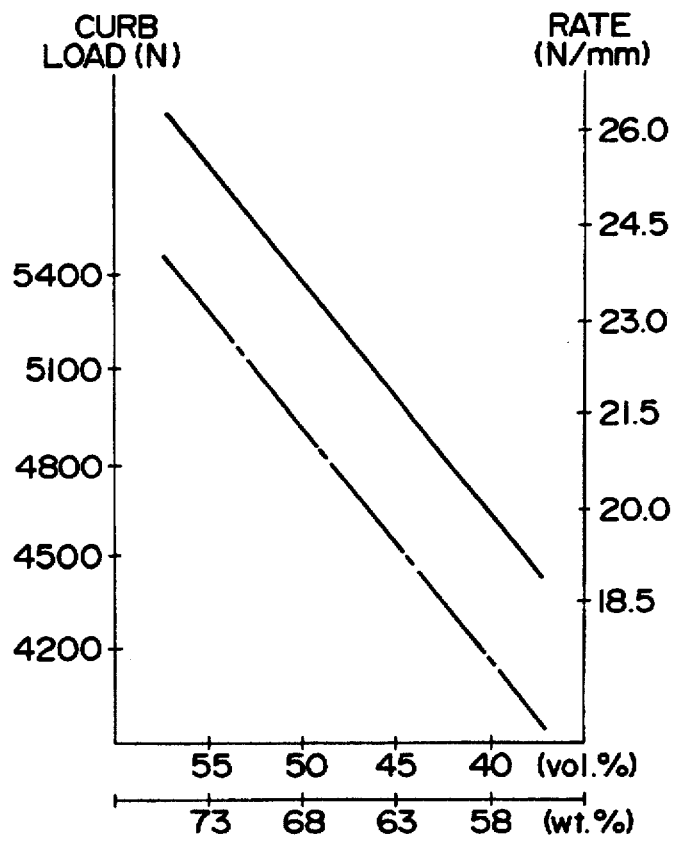

HYBRID COMPOSITE LEAF SPRINGS

This is a division of U.S. Ser. No. 08/184,548 filed Jan. 21, 1994, now U.S. Pat. No. 5,425,829, which is continuation-in-part of U.S. Ser. No. 08/024,894, filed Mar. 1, 1993 now abandoned, which is a file-wrapper-continuation of U.S. Ser. No. 07/712,288, filed Jun. 10, 1991, now abandoned.

BACKGROUND OF THE INVENTION

This invention relates generally to hybrid composite leaf springs with variable spring rates and, more particularly, to such springs and a method of manufacturing such springs by substituting or combining different proportions of fibers of different moduli.

Springs are used as part of an apparatus, called a suspension, which functions to suspend a vehicle's running gear from the vehicle frame, whether separate from or integrated with the vehicle body. The spring suspension is thus, technically, a part of the vehicle structure. However, it differs substantially from what is conventionally considered to be a part or component of the vehicle structure.

Because a vehicle must have some degree of flexure, as do buildings and bridges, the structural parts of vehicles exhibit some flexure. However, this flexure is strictly limited, as each vehicle is "tuned" to provide a predetermined stiffness. These structural parts are subject to compression, tension, torsion and bending forces and to various combinations of them during operation of the vehicle.

A vehicle's suspension includes many component parts (control arms, knuckles, etc.) which are relatively rigid, and springs, which, by definition, are not. Springs must have a high degree of flexure to cushion the vehicle and its occupants from shocks as the vehicle traverses non-smooth terrain. While structural parts of necessity exhibit little flexure and minute deflection to maintain vehicle stiffness, springs must exhibit great flexure and large deflections to provide ride smoothness.

Many types of springs are used in vehicle suspensions. Multi-leaf steel springs have often been used for rear suspensions, while steel coil springs have been used for front suspensions. Torsion bars were used in the 1960s for rear suspensions. Independent rear suspensions often feature steel coil springs. Springs generally experience only a primary single stress during flexure in operation. Torsion bars and coil springs primarily experience torsion, while leaf springs primarily experience bending stress.

Steel leaf springs have a very high modulus of elasticity. Thus, a single thick steel leaf spring is too stiff for automotive vehicle use. In a given application where a single glass fiber/epoxy resin spring can be used, a multileaf steel spring comprising ten thin steel leaves must be used to provide the requisite spring rate.

Leaf springs have been made of carbon fibers molded together in an epoxy matrix. Like steel, carbon fiber leaf springs are also too stiff to use as a single thick leaf spring, due to the high modulus of carbon fibers. Whereas a certain automotive vehicle application can use a single glass fiber leaf spring, three or four thin carbon fiber leaves must be used. Thus, although carbon fiber composites are ideal for use in vehicle structural parts since they are stiff and can be formed into structural shapes (e.g., H, U, I, L, T, etc.), this very stiffness makes them unsuitable for single leaf springs.

Composite leaf springs constructed of glass fiber in an epoxy matrix have been used to replace steel leaf springs in high volume production of passenger cars and vans in recent years. For conventional cars and vans, composite leaf springs offer the advantage of improved packaging in addition to reduced weight. For example, in one prototype front-wheel drive station wagon, substituting glass fiber/epoxy rear leaf springs for the normal steel coil spring suspension resulted in increased rear passenger space. For sedan models, this same change would translate into increased luggage space. In the front suspension, it has been demonstrated that installation of a transverse composite leaf spring occupies less space in critical areas, enabling use of a lower hood line, which improves the aerodynamic efficiency of the car.

Additional benefits achieved by using these composite leaf springs are the high durability and the high elastic strain energy inherent in a glass fiber/epoxy resin construction. The elastic strain energy of glass fiber/epoxy resin is more than ten times that of steel. Composite leaf springs offer a 25% to 75% weight reduction over conventional steel springs and have a strength-to-weight ratio up to five times greater than that of steel springs.

In the area of suspension system design, composite leaf springs enable a reduction in component size or, in some cases, enable elimination of stabilizer bars, strut assemblies, control arms and other components. Vehicle ride and handling characteristics are also improved because the composite leaf springs offer increased roll rates while also allowing lower ride rates.

One of the first vehicles utilizing composite leaf springs as its rear suspension system was the 1981 Corvette. This composite leaf spring was used on all Corvettes having automatic transmission and standard suspension, comprising about 80% of production or 40,000 cars per year. This spring is a single leaf spring 49 inches long, weighing 8 pounds, which replaced a ten leaf steel spring weighing 41 pounds. This enabled a weight reduction of 33 pounds or 80%.

The Corvette composite leaf spring is of constant cross-sectional area design that tapers from a 2¼ inches by 1 inch center section to a nearly 5 inches by less than ½ inch section at each end. The spring is mounted laterally at the rear of the car and performs like two-back cantilever springs in supporting almost 2200 pounds of vehicle weight. Corvette uses this unusual design because there is insufficient space to accommodate a normal coil spring independent rear suspension. These Corvette springs are produced by using an automated filament winding/compression molding process based on computerized filament and winding equipment. The basic manufacturing process for composite leaf springs is known and described, for example, in U.S. Pat. No. 2,600,843 and U.S. Pat. No. 3,142,598.

Presently, most composite leaf springs are prepared at the same spring rate. However, ride improvements have been experienced in vehicles having composite leaf springs of reduced spring rates. By using beam theory and small deflection, the spring rate of a leaf spring defines as a ratio between spring load and deflection; under four-point or three-point bending it is described by the following governing equation:

$$R = P/D = 4 \times E \times (bh^3/L^3) \times (3K - 4K^3)^1$$

where R is spring rate, P is pressure, D is distance, E is material modulus, b is beam width, h is beam thickness, L is beam length, and K is loading location. As shown in the equation, the spring rate is a function of material modulus, spring geometry and the distance between loading and supporting points.

From the equation, it is seen that spring rate is sensitive to the spring geometry, especially thickness and length. Spring rate is proportional to the cubic power of the thickness-to-length ratio. However, varying spring rate by changing spring geometry (shape) is economically impractical for large-scale production because providing different spring shapes requires constantly retooling to provide different mold designs.

Spring rate is directly proportional to the stiffness or modulus of the material. For unidirectional composites, the modulus in the fiber direction can be calculated by the following equation:

$$E = \Sigma E_i V_i$$

where E and V are the modulus and volume fraction, respectively, of constituent i in the composite.

The load-carrying capability of a spring is the product of spring rate and deflection. Instead of varying the camber height or deflection, spring rate can be varied to produce a new load-carrying capability. Test results for two differently-shaped composite leaf springs, denoted A and B, which are designed for different load carrying requirements in a single vehicle, are shown in FIG. 2. The phantom line in FIG. 2 represents a hypothetical 17 N/mm rate spring for an A spring design. This spring has the same design load as springs of the B spring design.

The plot of load-carrying capabilities of the springs against deflection in FIG. 2 illustrates that deflection increases with load. The slope of the load-deflection line is the spring rate, which determines the stiffness of the spring. Since both springs have the same rate, 26 N/mm, their load deflection lines are parallel. Load-carrying capability is determined by camber height (i.e., the deflection from free shape to flat-out position.) Since spring B has a lower load-carrying requirement, a smaller camber height is used. Spring A utilizes a higher camber height to accommodate higher load requirements.

Where a softer vehicle ride is desired, a composite leaf spring that has a lower spring rate, i.e., lower flexural stiffness, can be used. There are several known ways to reduce the flexural stiffness of a composite leaf spring. One is to reduce the glass fiber content of the composite spring.

Sample composite leaf springs A and B contain 55 volume percent of glass fiber and 45 volume percent of epoxy. Since glass fiber has a much higher modulus than the epoxy resin matrix material, the composite modulus is directly proportional to the volume fraction of the glass fiber. The composite modulus of the leaf spring can be varied by varying the content of glass fiber. However, in practice, it is very difficult to produce a homogeneous composite spring having a low glass fiber content by using the filament winding process. Such a spring inevitably has resin-rich areas having lower strength and fiber-rich areas which are stress-concentrated, both of which lower performance of such a composite spring.

The spring rate of a composite leaf spring can be changed by changing the dimensions of the spring. This is an expensive solution since major rework of the spring winding tooling would be required. Also, this may be impractical, since great dimensional changes may be needed but may not be possible in a given vehicle application.

Also, spring rate can be reduced by replacing some of the glass fiber content with a fiber having a lower modulus than glass fiber. However, it is difficult to change the glass fiber content greatly in a filament winding process because of process constraints. Layering of different modulus fibers in a leaf spring has been tried, but this produces a spring subject to catastrophic operational failure because of delamination caused by non-uniform stress.

It would, therefore, be desirable to provide a composite leaf spring with a reduced spring rate and uniform stress, which utilizes glass fibers and other fibers and does not delaminate.

It would also be desirable to provide a method of making a hybrid composite leaf spring with a reduced spring rate which evenly distributes glass fibers and other fibers throughout a resin matrix.

It would be further desirable to provide a method of making a fiber-reinforced composite leaf spring having a reduced spring rate without modifying the molding tooling.

It would be yet further desirable to provide a method of making composite leaf springs which can have varying spring rates for a given spring dimension by changing the mix of different modulus fibers.

SUMMARY OF THE INVENTION

It is, therefore, an object of this invention to provide a hybrid composite leaf spring with a reduced spring rate and uniform stress which utilizes glass fibers and other fibers and does not delaminate.

It is another object of this invention to provide a method of making a hybrid composite leaf spring with a reduced spring rate which evenly distributes glass fibers and other fibers throughout a resin matrix.

It is a further object of this invention to provide a method of making a fiber-reinforced composite leaf spring having a reduced spring rate without modifying the molding tooling.

It is a yet further object of the present invention to provide a method of making composite leaf springs which can have varying spring rates for a given spring dimension by changing the mix of different modulus fibers.

It has been discovered that composite leaf springs with reduced spring rate and uniform stress can be made without modifying current filament winding process tooling by uniformly and consistently replacing part of the glass fiber content with different modulus fibers. For example, lower rate glass fiber/epoxy composite leaf springs can be produced by evenly replacing a portion of the glass fiber content with a lower modulus fiber such as nylon or polyethylene terephthalate fibers while maintaining the same fiber content.

In accordance with a preferred practice of this invention, the method of producing homogeneous composite leaf springs having lower spring rates changes the ratio of high modulus fibers to low modulus fibers, while keeping fiber distribution even throughout the matrix and keeping the total fiber content constant. Holding the total fiber content constant is important in many high performance composite preparation processes such as filament winding, pultrusion and pulforming.

By using this method, composite leaf springs having different predetermined spring rates can be manufactured by varying the ratios of the high modulus fiber to the low modulus fiber while maintaining homogeneity.

By using this method, dimensionally identical springs having different spring rates can be made. Alternatively, springs of different dimensions but having the same spring rates can be made.

BRIEF DESCRIPTION OF THE DRAWINGS

FIG. 1 is a schematic depiction apparatus which performs the method of manufacturing a composite leaf spring according to this invention;

FIG. 2 is a graph plotting spring load carrying capabilities of two different composite glass fiber springs against spring deflection;

FIG. 3 is a graph plotting spring load and rate against glass fiber content;

FIG. 7 is a perspective view of an exemplary composite leaf spring according to this invention; and FIG. 8 is an enlarged view of a portion of the spring shown in FIG. 7.

DETAILED DESCRIPTION OF A PREFERRED EMBODIMENT

Figure 4:
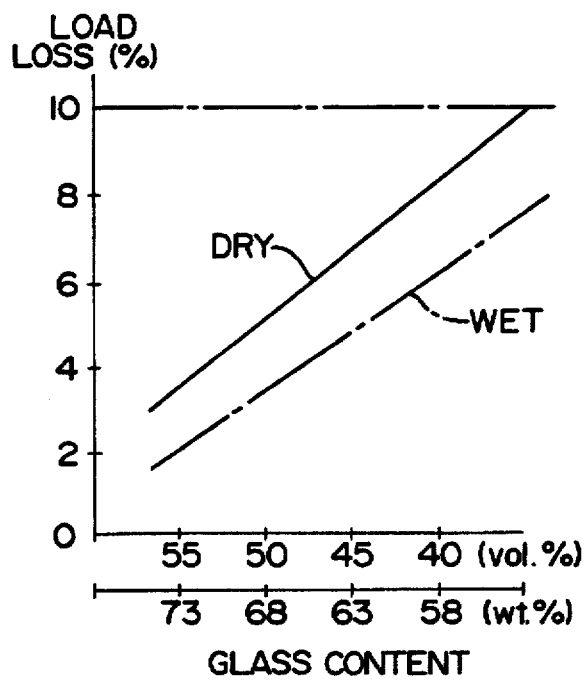
FIG. 4 is a graph plotting load loss against glass fiber content after wet and dry creep.

An effective method of maintaining homogeneity of the glass fiber content while varying the composite modulus uses a hybrid composite which incorporates multiple fibers in a resin matrix. In this new hybrid composite leaf spring, a portion of the glass fiber is replaced by a different, second fiber having a different modulus. Through extensive testing, it has been found that nylon fiber and polyethylene terephthalate fiber are the preferred second fibers. Both of these fibers have high strength, good chemical resistance, good work recovery and low moisture absorption.

The physical properties of epoxy, glass and PET fibers are listed in the following Table I:

TABLE I

Properties of Constituents of Glass/PET/Epoxy Composites

|  | Epoxy | E-glass | PET |
|---|---|---|---|
| Specific Gravity | 1.19 | 2.58 | 1.38 |
| Tensile Strength (GPa) @ 22° C. | 0.10 | 1.80 | 2.20 |
| Tensile Modulus (Gpa) | 3.50 | 72.0 | 10.0 |
| Elongation (%) | 3 | 2–3 | 22 |
| Thermal Expansion Coefficient (1/C) (m/1000000 m) | 60 | 5 | −160 |
| Softening or Melting Temp. (°C.) | 160 | 841 | 265 |
| Dielectric Costant @ 60 Hz | 3.5 | 5.4 | 5.1 |
| Water Uptake (%) @ 21° C. & 65% R.H. | 5.0 | 0 | 0.4 |

There are many advantages of using PET fibers in a hybrid composite leaf spring. First, PET fibers have high strength modulus and elongation; their strength-at-break is equivalent to that of glass fibers. Second, PET fibers have high working temperature. Polyethylene terephthalate has a melting temperature of 265° C. and a working temperature as high that of epoxy, i.e., 160° C. Third, PET fibers are relatively hydrophobic, absorbing less water than epoxy under ambient conditions. Fourth, PET has very high ductility and is thus insensitive to abrasion which results from surface flaws or defects introduced during the manufacturing process. This contrasts with glass fibers, which are very sensitive to these same surface flaws, which affect strength and modulus. Thus, the PET fibers in a composite leaf spring tend to at least partially shield the glass fibers from abrasion experienced during the filament winding process.

Composite leaf springs according to this invention are manufactured by a method using the equipment schematically shown in FIG. 1. A rack 20 mounts a plurality of doffs 22 of glass fibers and a plurality of doffs 24 of a second, different fiber, which in the preferred embodiment are PET (PET) fibers. The number of doffs illustrated are exemplary only. The actual number of doffs of each fiber type actually used will depend on the ratio of each type of fiber used for a particular spring design.

As illustrated in FIG. 1, 12 doffs 22 of glass fibers and four doffs 24 of PET fibers are used to make the sample spring denoted "Hybrid I" in Table II. Hybrid springs II and III are made by the same method but with the fiber ratios shown in Table II. Strands 26 of glass fibers and strands 28 of PET fibers are drawn from respective doffs 22 and 24 over tensioning bars 30 and 32 through a bath 34 where they are wetted with resin 36. Each such strand contains many, e.g. about 4000, individual fibers. Two strands of PET fibers are combined with six strands of glass fibers to form each of two identical resin-impregnated bundles of fibers, termed rovings, 38 and 40, which are drawn through dies 42 and 43 to wipe off excess resin.

Upon exiting dies 42 and 43, rovings 38 and 40 are drawn over a traverse mechanism 44, 45 which evenly lays multiple parallel rows of rovings 38 and 40 into mold cavities 46 and 48 of a mandrel 50. Mandrel 50 is rotated to gather a predetermined number of wraps of rovings 38 and 40 in spring-shaped mold cavities 46 and 48 (see Table II) and then stopped. Traverse mechanism 44, 45 assures that the uncured spring blanks of accumulated wetted rovings have substantially parallel glass and PET fibers evenly distributed throughout the resin matrix.

The spring blanks are then compressed and cured in molds 46 and 48 to produce springs which are removed from the molds and further processed (remove flash, drill, etc.) into completed springs, which are than tested, as described below. Each finished spring made and tested has substantially parallel glass and PET fibers evenly and uniformly distributed throughout the resin matrix, with the strands of PET fibers distributed amongst the strands of glass fibers in accordance with the way the roving was formed to provide a homogeneous cross-section in the spring.

A finished composite leaf spring 52 is shown in FIG. 7. Since the spring 52 is molded using the same number of glass fiber strands 26 and, in this example, PET fiber strands 28 along the whole length, the transverse cross-sectional of the spring is constant along its length.

FIG. 8 illustrates an enlarged portion of a typical cross-section of the glass fiber/PET fiber reinforced epoxy resin spring 52 depicted in FIG. 7. FIG. 8 depicts in cross-section a single wrap of a single roving 40 of six strands 26 of glass fibers and two strands 28 of PET fibers. The enlarged illustration may be somewhat idealized in its orderly arrangement of the strands into two straight rows. In actual practice, of course, the strands may be displaced somewhat during wrapping and molding. However, the concept is that the whole cross-section of the spring is a replication of whatever pattern of strands is generated when the respective rovings are gathered and formed.

As stated, the properties of the composite spring can be controlled and/or changed by changing the proportion and, to a lesser extent, the placement of the lower (or different) modulus fiber strands with the glass fiber strands.

The PET fibers used were Allied Signal Company's COMPET® IW71 rovings at 6,000 and 11,000 denier. The glass fibers used were the "E" type, having excellent moisture resistance and property retention in wet environments. The epoxy resin used was a DGEBA-type epoxy which has good adhesion, low shrinkage, good chemical resistance and good dielectric properties. The curing agent used was a diamine. Epoxy was mixed with diamine at the stoichiometric ration to give optimum performance.

Hybrid composite leaf springs using various ratios of glass fiber/PET fiber content were prepared and tested. The arrangement of glass fiber/PET (PET) fiber bundles and numbers of winding wraps are shown in Table II. Total fiber content remained constant at 55 volume percent. All wraps were substantially parallel, as in FIG. 1, and the resultant composite was homogeneous (i.e., PET fibers were evenly distributed among the glass fibers and all fibers were distributed repeatedly and evenly throughout the epoxy matrix).

TABLE II

Glass/PET Management

| Composition | Ratio | Wraps | Glass (Vol %) | PET (Vol %) |
|---|---|---|---|---|
| Control | 16 glass | 26 | 55 | 0 |
| Hybrid I | 12 glass<br>2 PET(11K)<br>2 PET(6K) | 27 | 49 | 6 |
| Hybrid II | 12 glass<br>4 PET(11K)<br>2 PET(6K) | 25 | 45 | 10 |
| Hybrid III | 10 glass<br>8 PET(11K) | 26 | 39 | 16 |

The interlaminar shear strengths of these hybrid composite springs were tested using a short beam three-point loading test according to ASTM D-2344. The center pan of the spring having a thickness of 1.7 cm was cut using a diamond saw to produce test specimens 1.7 cm×10.5 cm. The test was performed on an Instron universal testing machine using a span-to-depth ratio of 4:1 and a cross head speed of 0.1 mm/minute. After the test, the shear failure mode was confirmed and then shear strength was determined from the failure mode and simple dimensions.

The effects of glass fiber/PET fiber content on load-deflection behavior were tested. The results, as indicated by a plot of load and rate against the glass fibers/PET fiber content, are shown in FIG. 3. A good first order relationship between spring rate and glass fiber content was obtained. Similar correlation between the reference load (curb load) and the glass fiber content was also observed. The arrow bars represent three standard deviations. The small data deviations suggest that good glass fiber/PET fiber distribution (i.e., homogeneity) was achieved. A summary of the test results is shown in Table III. All test data are normally distributed and each data set is statistically different from its neighboring data set at a 99% confidence level.

TABLE III

Rate and Reference Load of Hybrid Springs

| Composition | Spring Rate (N/mm) | Reference Load (N) |
|---|---|---|
| Control | 26.0 ± 0.2* | 5286 ± 46 |
| Hybrid I | 23.3 ± 0.3 | 4756 ± 49 |
| Hybrid II | 21.9 ± 0.3 | 4515 ± 39 |
| Hybrid III | 19.0 ± 0.2 | 4063 ± 35 |

*mean ± std. dev.

The test results of these hybrid composite springs after dry creep and wet creep are shown in FIG. 4, where load loss is plotted against glass fiber content. Each data point in this graph represents the average test results from four springs. A good first order linear relationship between load loss and glass content was observed. Load loss increases as the PET fiber content increases.

FIG. 4 illustrates that none of the samples have exceeded the 10% load loss limit. No external and internal damage could be found after the test. It is thought that load loss is caused by relaxation of the PET fibers at high temperature, rather than by fiber breakage. The PET fiber is a thermoplastic which is not cross-linked. It can yield under stress, and temperature accelerates this relaxation process.

Figure 5:
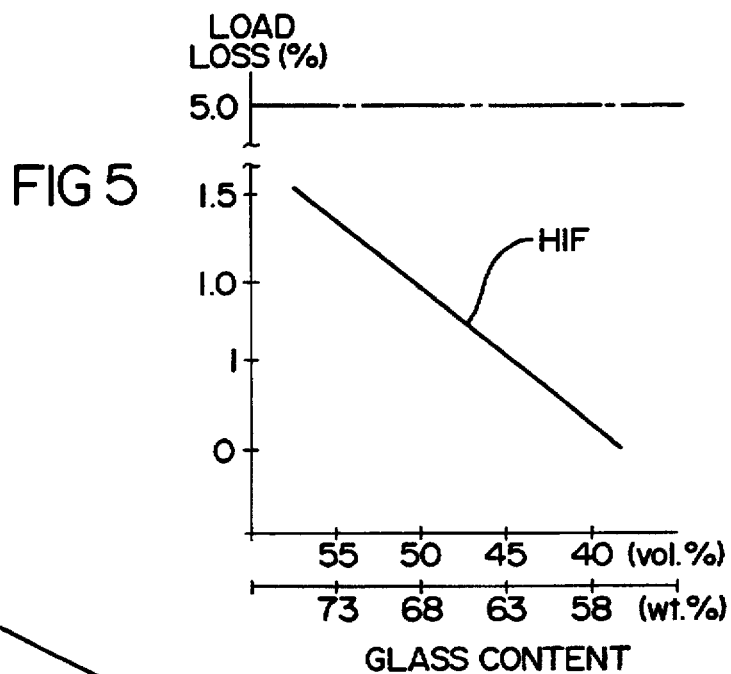
FIG. 5 is a graph plotting load loss against glass fiber content after high temperature fatigue.

FIG. 4 indicates that dry creep results in more load loss than does wet creep. This suggests that performance of the hybrid composite leaf springs is more sensitive to temperature than humidity and is attributed to the hydrophobic characteristic of the PET fiber. Load loss of these hybrid composite leaf springs after temperature fatigue is shown in FIG. 5. Each data point is an average of two test results. Fatigue load loss appears to decrease with increasing PET fiber content, even though the first order regression line does not have good correlation with the experimental data. This result is attributed to the high ductility characteristic of PET fibers. It is thought that PET fibers are able to absorb more fracture energy and retard crack propagation, resulting in enhanced fatigue performance.

Figure 6:
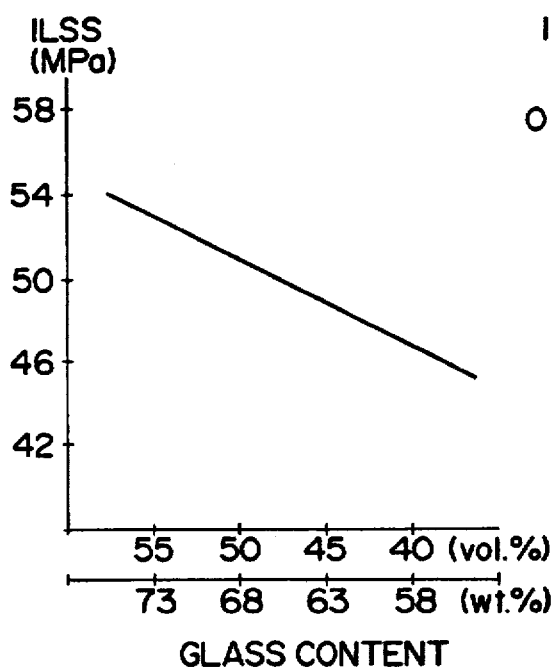
FIG. 6 is a graph plotting interlaminar shear strength against glass fiber content.

Interlaminar shear strength (ILSS) data is plotted against the glass fiber content in FIG. 6. Each data point represents an average of 12 test samples where the arrow bars represent three standard deviations. There is good correlation between interlaminar shear strength and glass fiber content. The linear decrease in shear strength is attributed to the corresponding decrease in materials stiffness as glass fiber content decreases, rather than to a lack of bonding between the PET fibers and the epoxy matrix.

The glass transition temperature, Tg, of these hybrid composite springs were analyzed using a DuPont 981 dynamic mechanical analyzer (DMA) with a 9900 thermal analyzer. Samples of 80 mm×12 mm×1.5 mm were cut from the center section of the spring and scanned from 25° C. to 250° C. at a heating rate of 4° C./minute. The glass transition temperature is defined as the location of the major peak of the loss tangent curve.

The glass transition temperatures of the glass fibers/PET fiber hybrid composites are summarized in Table IV. Both experimental and normalized glass transition temperatures (Tg) are presented. Only one Tg was observed for each composition, and this Tg was not affected by the presence of PET fiber. This Tg represents the transition behavior of the epoxy matrix. Since the crystalline PET does not have a Tg, it suggests that the PET fibers act as an inert filler in the composite and do not participate in the curing reaction of the epoxy matrix.

These test results show that the addition of the PET fibers did not affect Tg and thus will not degrade the mechanical performance of the glass fiber/epoxy matrix under dynamic loading during temperature excursions. This is an important characteristic because automotive springs are sometimes located near heat sources, such as an exhaust pipe of differential, and must perform at a variety of temperature conditions.

TABLE IV

| Composition | Glass Transition Temperature (Tg) | |
| --- | --- | --- |
| | Tg from DMA(°C.) | Normalized Tg(°C.)* |
| Control | 175 | 171 |
| Hybrid I | 178 | 174 |
| Hybrid II | 175 | 169 |
| Hybrid III | 169 | 166 |

*Normalized at 1 Hz by W-L-F-equation

These data indicate that spring rate and load carrying capabilities of glass fiber/PET fiber hybrid composite leaf springs vary linearly with the ratio of glass/PET fiber content. Creep performance decreases as PET fiber content increases; this results from the relaxation behavior of the thermoplastic PET fiber under high temperature conditions. Based on the fact that the creep performance is more sensitive to temperature than moisture, it is recommended that PET fiber content be limited to 15 volume percent to ensure that strength and durability requirements are met.

Fatigue performance improves as PET fiber content increases because the ductile PET fibers can dissipate energy and stop the growth of fatigue cracks better than glass fibers. Interlaminar shear strength decreases with decreasing glass fiber content because of decreasing material stiffness. The presence of PET fibers changes the brittle shear failure mode to a ductile failure mode.

Thus, this invention provides a method of producing a variety of dimensionally identical homogeneous composite leaf springs, all having different moduli. All springs are manufactured identically, with only the ratio of glass fibers and other modulus fibers being varied.

In all springs, the fibers are wound in parallel relationship, with all fibers being evenly distributed throughout the resin matrix and the different modulus fibers being evenly distributed throughout the glass fibers. It is important that the strands not be crossed at any appreciable angle, as in a basket weave arrangement, since a spring resulting from such a fiber orientation will be at least somewhat layered and subject to delamination in use. In contrast, the springs of this invention are homogeneous, have uniform stress, and experience no delamination in use.

The hybrid composite springs using polyester fibers exhibit better fatigue performance than an equivalent spring having only glass fibers. In addition, these springs have superior abrasion resistance than purely glass springs.

While only a preferred embodiment has been illustrated and described, obvious modifications thereof are contemplated within the scope of this invention and the following claims.

The embodiments of the invention in which an exclusive property or privilege is claimed are defined as follows:

1. A molded resin-bonded hybrid composite automotive leaf spring comprising a plurality of parallel strands of fibers bonded in a resin matrix, said fibers comprising strands of glass fibers and strands of different modulus fibers grouped together in bundles which form a pattern that is replicated throughout the cross-section of the spring, all of said strands being distributed throughout the resin matrix to provide a homogeneous structure, said different modulus fibers being selected from the group consisting of polyethylene terephthalate and nylon fibers and having a lower modulus, greater ductility and better abrasion resistance than said glass fibers.

2. A molded resin-bonded hybrid composite automotive leaf spring comprising a plurality of parallel strands of fibers bonded in a resin matrix, said fibers comprising strands of glass fibers and strands polyethylene terephthalate fibers grouped together in bundles which form a pattern that is replicated throughout the cross-section of the spring, all of said strands being distributed throughout the resin matrix to provide a homogeneous structure, said polyethylene terephthalate fibers having a lower modulus, greater ductility and better abrasion resistance than said glass fibers.

3. A leaf spring according to claim 2, wherein the total fiber content is not more than 45 volume percent, including not more than 15 volume percent of polyethylene terephthalate fibers.

4. A molded resin-bonded hybrid composite automotive leaf spring comprising a plurality of parallel strands of fibers bonded in a resin matrix, said fibers comprising strands of glass fibers and strands of different fibers having a lower modulus than said glass fibers, said glass fibers and said different fibers being grouped together in bundles which form a pattern that is replicated throughout the cross-section of the spring, all of said strands being distributed throughout the resin matrix to provide a homogeneous structure.

5. A leaf spring according to claim 4 wherein said different fibers have greater ductility and better abrasion resistance than said glass fibers.

* * * * *